US006601159B1

(12) United States Patent
Smith et al.

(10) Patent No.: US 6,601,159 B1
(45) Date of Patent: Jul. 29, 2003

(54) DYNAMICALLY-SWITCHED SUPPLEMENTAL INFORMATION SUPPORT SYSTEM FOR A COPIER SYSTEM

(75) Inventors: Craig A. Smith, Pittsford, NY (US); William R. Hartman, Rochester, NY (US); Mark A. Byers, Fairport, NY (US); Michael B. Neary, Manhattan Beach, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/825,994

(22) Filed: Apr. 4, 1997

Related U.S. Application Data

(63) Continuation of application No. 08/435,125, filed on May 5, 1995, now abandoned, which is a continuation-in-part of application No. 07/815,217, filed on Dec. 31, 1991, now abandoned.

(51) Int. Cl.[7] .................................... G06F 17/66

(52) U.S. Cl. ........................ 712/29; 705/1; 700/1; 345/336; 345/338; 399/9; 399/11; 399/42; 399/81; 399/110

(58) Field of Search ..................... 705/1; 345/336, 345/338; 399/9, 11, 42, 81, 110; 712/29; 700/1–306

(56) References Cited

U.S. PATENT DOCUMENTS

| | | | |
|---|---|---|---|
| 4,498,098 A | 2/1985 | Stell | 358/22 |
| 4,500,971 A | 2/1985 | Futaki et al. | 355/14 C X |
| 4,599,611 A | 7/1986 | Bowker et al. | 340/721 |
| 4,682,158 A | 7/1987 | Ito et al. | 340/679 |
| 4,873,431 A | 10/1989 | Ito | 250/227 |
| 4,899,292 A | 2/1990 | Montagna et al. | 364/521 |
| 4,954,979 A | 9/1990 | Eiber et al. | |
| 4,992,947 A | 2/1991 | Nimura et al. | 364/444 |
| 5,036,361 A | 7/1991 | Filion et al. | 355/209 |
| 5,065,345 A | 11/1991 | Knowles et al. | 395/154 |
| 5,077,582 A | 12/1991 | Kravette et al. | 355/206 |
| 5,113,222 A | 5/1992 | Wilson et al. | 355/209 |
| 5,117,407 A | 5/1992 | Vogel | 369/30 |
| 5,140,693 A | 8/1992 | Ninomiya | 395/775 |
| 5,159,546 A | 10/1992 | Inoue et al. | 364/146 |

FOREIGN PATENT DOCUMENTS

| | | | |
|---|---|---|---|
| EP | 0301788 | * 2/1989 | |
| JP | 0 032 273 | 2/1989 | 355/206 |

OTHER PUBLICATIONS

PC Week, vol. 5, No. 11, Mar. 15, 1988, Cummings: *Optical's Vast Expanses*, pp. 5/17, 5/19, 5/22 and 5/23.

* cited by examiner

*Primary Examiner*—James P. Trammell
*Assistant Examiner*—James Reagan

(57) ABSTRACT

An integrated information support system (IISS) uses a stand-alone, large capacity memory device, such as a CD ROM, to enhance the user interface of a copier system. The IISS, providing system users with access to vast quantities of graphical, textual, video and audio information, is a separately controlled system which may be integrated with the normal control functions of the copier system. Information is retrieved from the memory device and presented to a system user either spontaneously, on-demand, or in response to specific system conditions such as faults. In a preferred embodiment, an expert coach controls the presentation of information and is capable of monitoring user actions to, for example, ensure a suggested course of action is actually being followed. The IISS may advantageously share existing user interface facilities, such as the copier system's video monitor and button matrix. By providing users with access to a vast store of sophisticated reference, training and maintenance data, the integrated information support system can greatly reduce the need for formal user training and ongoing customer support of complex copier systems.

20 Claims, 2 Drawing Sheets

DYNAMICALLY-SWITCHED SUPPLEMENTAL INFORMATION SUPPORT SYSTEM FOR A COPIER SYSTEM

This application is a continuation of application Ser. No. 08/435,125 filed May 5, 1995, which was a continuation-in-part of application Ser. No. 07/815,217 filed on Dec. 31, 1991, both now abandoned.

BACKGROUND OF THE INVENTION

The present invention relates generally to an improved user interface for an electrophotographic reproduction machine, commonly referred to as a "photocopier" or, more simply, a "copier," as well as multifunction devices. In particular, the present invention relates to an information support system which may be integrated with the existing user interface of a copier to provide vastly improved functionality in terms of training, problem correction, and customer support.

Modern copier systems and emerging multifunction devices are becoming increasingly complex as manufacturers strive to satisfy the expanding functional demands of their customers. A multifunction device typically provides a photocopier and one or more additional systems, such as a scanner, printer, or facsimile machine, as a single unit. As these machines become more complex, however, the need for effective training of new users gains importance. A principal concern of prospective purchasers is whether users will be able to effectively take advantage of the often complex features of today's sophisticated copiers, and at what cost. Training on a complex copier system can involve substantial expense in terms of time spent by both potential users and trainers—expense that necessarily adds to the cost of the machine. Accordingly, both manufacturers and customers have an interest in reducing formal training requirements to the maximum extent possible.

An efficient approach to reducing formal training requirements for complex copier systems is to expand the informational capability of the copier itself. That is, the need for formal user instruction can be greatly reduced by providing the copier system with the ability to provide initial training to new users and ongoing support to assist in problem diagnosis and correction.

While most modern reproduction devices offer users some type of information support, the amount of information available and the presentation of such information has been inadequate to eliminate the need for extensive formal training or frequent resort to reference manuals. According to the present invention, such existing copiers can be made much more "user-friendly" through the integration of a comprehensive, self-controlled information support system with access to vast amounts of reference and training data stored on a mass storage device, such as a CD ROM. Not only can such an integrated information support system (IISS) improve the informational capability of the copier, but it advantageously does so in a cooperative manner that does not interfere with the existing functionality of the copier, thereby eliminating the need to purchase an entirely new system.

The use of a CD ROM to store large quantities of data for later retrieval is well-known and is described, for example, in U.S. Pat. No. 4,803,643 to Hickey, relating to a system for storing and retrieving textual and graphical data in a publishing application. Another example of the use of a CD ROM may be found in U.S. Pat. No. 4,827,419 to Selby, relating to a navigational planning device using a CD ROM for storing data records including map images and other geographic information which may be accessed in response to user input. Yet another example may be found in U.S. Pat. No. 4,868,736 to Walker, which describes an access control system through which a user may retrieve information such as software, music and videos from a compact disc.

It is similarly known to provide a mechanism for guiding a user through the large amounts of information which can be stored on a CD ROM. For example, U.S. Pat. No. 4,835,682 to Phillips et al. describes an expert information-.system for assisting a user in making decisions based on information, including video frame data, held in a mass storage device.

While accessing information stored on CD ROM and similar storage devices is known in the art, an effective user interface for a copier system must go beyond merely providing users with access to a vast store of data. To be most useful, the information must be presented to the user on an as-needed basis. That is, the information must be available not only when specifically requested by the user, but also as errors or other events occur in the copier system. Moreover, since most copiers already present status and error information, an integrated information support system must be capable of cooperating with existing informational facilities in an efficient and economical manner.

SUMMARY OF THE INVENTION

The above-referenced deficiencies in the ability of prior art copiers to provide information to users are overcome by the integrated information support system of the present invention. According to the teachings of the present invention, the user interface of existing copiers can be greatly enhanced by giving users access to large quantities of information relating to such topics as training, functionality, and fault correction. Moreover, this information is provided in a manner that supplements, rather than replaces, the existing informational facilities of the copier, thereby avoiding the need to replace existing systems.

In one embodiment of the present invention, an IISS includes a control device having a central processing unit and capable of cooperating with the existing control system of a copier. The control device includes a memory controller through which the control device is coupled to a large-capacity, standalone memory device, such as a CD ROM or other optical disc memory, which can store control program software, textual and graphical data, still and full-motion video data, and audio data. The memory controller is responsible for actually retrieving data from the memory device and routing the data to the appropriate components of the control device for subsequent presentation to a user. The control device also has internal memory facilities including a ROM (read only memory), in which may reside control-oriented firmware and a software-based expert coach, and a RAM (random access memory), into which control program software retrieved from the CD ROM may be loaded at system start-up. The internal memory may also be used to store data retrieved from the CD ROM prior to presenting the information to a user.

Among the other components of the control device is a digital-to-analog (A/D) audio converter for translating digitally-stored audio data retrieved from the CD ROM into an analog audio signal for presentation by a speaker coupled to the control device. A text-to-speech conversion device may also be used to conserve memory resources. The control device also includes a bitmap controller for coordinating the retrieval and display of bitmap image data, and a button interpreter for translating input received from a user input device, such as a button matrix.

One of the advantageous features of the present invention is the ability to share the existing user interface facilities of a copier system. To this end, the control device of the integrated information support system is coupled to a display controller, which is in turn coupled to the copier's video monitor. The video monitor may be a CRT (cathode ray tube), an LCD (liquid crystal display), or any other suitable display device. The display controller, which may be implemented as an application specific integrated circuit (ASIC), is configured to coordinate the display of both bitmap image data provided by the information support system and graphical image data, typically comprising character tile data, provided by the photocopier's existing informational facilities.

The control device may similarly provide shared use of an existing user input device, such as a button matrix, using a switching means. During normal operation of the copier, input from the button matrix passes unaltered through the control device to the machine's logic controller, and then to the display controller. However, when the IISS has control, user input is passed to a button interpreter that translates the input to corresponding instructions for the information support system, which determines which information is required and then passes the instructions to the display controller.

Both the control device and the display controller are coupled to a network bus within the copier system. In one embodiment, the control device can be defined to the copier as an additional node on its network bus, thereby enabling two-way communication between the controller of the copier and the IISS. Among the pertinent information the control device receives over the network bus is status and error information output by a plurality of sensors distributed in the copier.

The integrated information support system has the ability to provide users with sophisticated visual and audio presentations relating to training for new users, sales demonstrations, and explanations of specific system functionality on request. Additionally, the IISS can present information in response to specific system conditions. For example, upon detection of a fault condition, as indicated by status information received over the network bus, the IISS can spontaneously provide comprehensive guidance on how to resolve the problem. Moreover, the information support system can actively monitor user actions to ensure the corrective procedures are being followed.

The presentation of information may be advantageously enhanced through the use of an expert coach, preferably implemented as a software program. The expert coach can ensure information is provided to users efficiently, with a minimum of user input required. The integrated information support system of the present invention thus greatly improves the ability of a copier system to present information to users in as simple a manner as possible, thereby reducing the cost (both in time and money) otherwise required for extensive training or ongoing customer support.

The foregoing is a brief description of some of the advantages of the present invention with respect to deficiencies in current copiers. Other features, advantages and embodiments of the invention will be apparent to those skilled in the art from the following detailed description, the accompanying drawing figures, and the appended claims.

DETAILED DESCRIPTION

The present invention provides an integrated information support system for a copier machine. The IISS may be built into a new copier, or may be used to enhance the user interface of an existing copier system. An example of one type of copier to which the present invention may be advantageously applied is described in U.S. Pat. No. 5,036,361 to Filion et al., the disclosure of which is specifically incorporated herein by reference.

Figure 1:
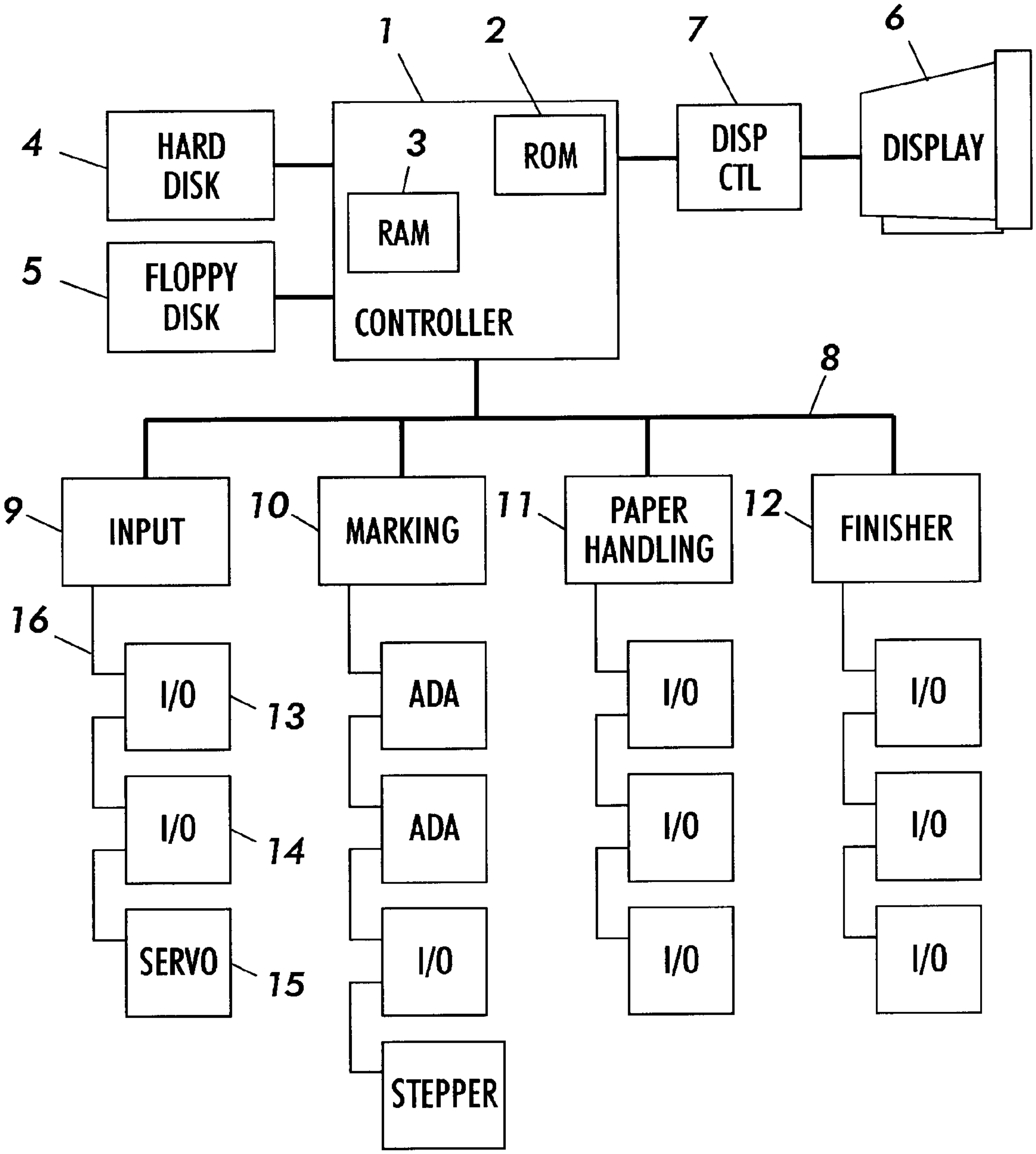
FIG. 1 is a block diagram of the operating control systems and memory for a copier system of a type to which the present invention may be applied.

As illustrated by the block diagram of FIG. 1, such a copier typically includes a controller 1 for regulating the various functions of the copier system, with the controller 1 comprising one or more programmable microprocessors (not shown). The controller 1 includes a suitable memory, generally including both a ROM 2 and a RAM 3, for storing data such as operating and control information, and job programming instructions. The available memory may also include a hard disk 4 and a floppy disk drive 5 coupled to the controller 1. A suitable display 6 is also coupled to the controller 1 through a display controller 7.

In the copier of FIG. 1, a shared line network bus 8 interconnects a plurality of core-printed wiring boards including an input station board 9, a marking/imaging board 10, a paper handling board 11, and a finisher/binder board 12. Each of the core-printed wiring boards are in turn connected to local input/output devices through respective local buses. For example, the input station board 9 is connected to digital input/output boards 13 and 14 and servo board 15 via local bus 16.

It should be noted that the copier system of FIG. 1 is described merely for purposes of illustrating one type of device to which the present invention may be advantageously applied. The particulars of the device are not necessary to a complete understanding of the invention disclosed and claimed herein, and thus are not discussed in detail.

Figure 2:
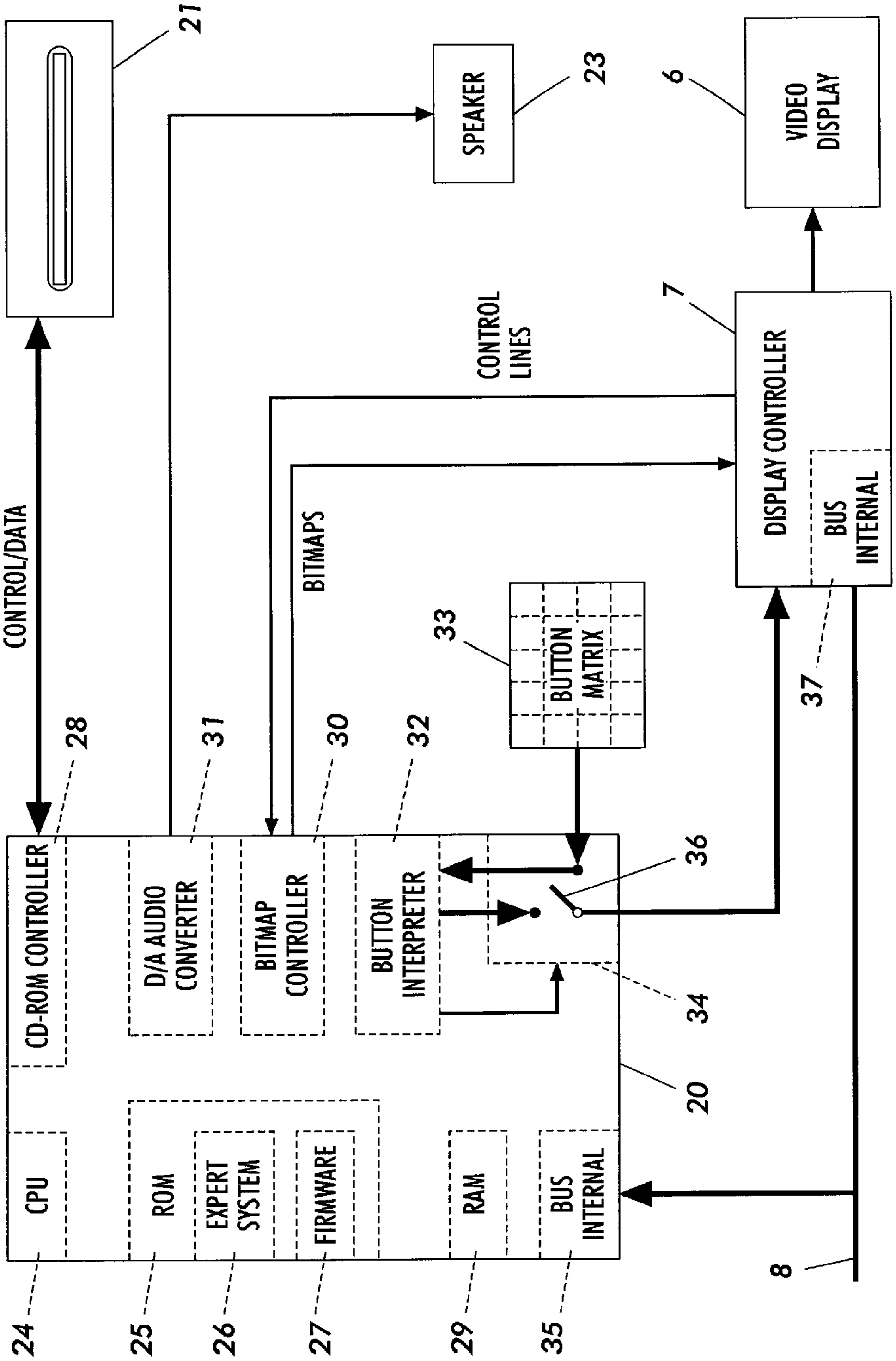
FIG. 2 is a block diagram of an embodiment of an integrated information support system according to the present invention.

Referring now to FIG. 2, an embodiment of an integrated information support system according to the present invention includes a control device 20 coupled to a large-capacity, stand-alone memory device 21. The memory device 21, which ideally is a CD ROM device (that is, a compact disc read only memory), enables the IISS to access vast stores of digital information held on compact discs (not shown). Such information may include, for example, compressed and uncompressed video frame data, full-motion video data, audio data and text data. An advantage of using a CD ROM is that the information source can be easily changed or supplemented to provide, for example, alternate languages, instructions for different levels of use, and learning support for different functions (e.g., user training, sales presentations, service support). The storage and retrieval of such data from a CD ROM is well known in the art, and thus is not described herein. The memory device 21 preferably is mounted within the interior of the copier cabinet, but may also be mounted externally.

The integrated information support system may communicate with a system user both visually, using the video display 6, and aurally, using a speaker 23. The video display 6, which typically comprises a CRT (cathode ray tube), enables the display of both textual and video data. In this embodiment, the IISS shares the video monitor typically provided with a high-end copier system. In an alternate embodiment (not shown), the IISS could have its own dedicated video display. Such an approach might be desirable where the IISS was used to supplement the user interface of a copier lacking an adequate video display monitor of its own. Similarly, the speaker 23 may be either a built-in speaker provided with an existing copier speaker or a speaker dedicated to the IISS. As will be recognized by persons skilled in the art, the integrated information support system may be implemented as a separate device using a personal computer or a multimedia personal computer.

Looking more closely at the control device 20, a microprocessor-based controller 24, which may comprise a suitably-coded central processing unit (CPU), coordinates the supervisory and control functions of the integrated information support system. While not explicitly shown in FIG. 2, persons skilled in the art will recognize that the controller 24 may be coupled either directly or indirectly to the various other components of the control device 20. The control device 20 also includes a ROM 25, in which resides an expert coach 26 (discussed below) and firmware 27.

The control device 20 also includes a CD ROM controller 28 for controlling the retrieval of data from the memory device 21. The CD ROM controller 28 may send control signals to the memory device 21, such as the address of data to be presented to a system user, and receives data retrieved from the memory device 21. The CD ROM controller 28 preferably includes a microprocessor (not shown) so that the main controller 24 of the control device 20 is not overburdened by time-consuming data transfer tasks. The CD ROM controller 28 advantageously eliminates the need for the control board normally supplied with a CD ROM device, since the CD ROM controller 28 can address the memory device 21 directly.

The CD ROM controller 28 of the present embodiment recognizes at least three different types of data stored in the memory device 21: control program, video and audio. Moreover, the CD ROM controller 28 is responsible for routing these different types of data to the appropriate components of the control device 20. For example, control program data retrieved from the memory device 21 is automatically stored in a RAM 29 of the control device 20 when the IISS is booted up. When video information is to be presented to a user, the CD ROM controller 28 retrieves the data and routes it to a bitmap controller 30. Similarly, audio data is routed to a digital-to-analog (D/A) audio converter 31 for translating digitally-stored audio information to analog signals which may be broadcast by the speaker 23.

To more efficiently use the available storage capacity of the memory device 21, the video and audio data may be stored in a compressed format using, for example, pulse code modulation (PCM). In such a case, the CD ROM controller 28 would include a module (not shown) for decompressing the retrieved data prior to routing it.

The control device 20 also includes a button interpreter 32 for permitting a system user to communicate with the integrated information support system through a button matrix 33. As with the video display 6, the present embodiment contemplates shared use of an existing button matrix or keypad otherwise used by a system operator to control the normal functions of the copier system. However, the button matrix provided with certain existing copiers may prove inadequate to fully take advantage of the capabilities of the IISS, in which case additional buttons or keys would be necessary. In the present embodiment, user input from the button matrix 33 is received by an interface 34, which then passes the input to the button interpreter 32.

An important feature of the present invention is the truly integrated nature of the information support system. To achieve the desired degree of integration, the information support system must not only be able to share user interface resources with the copier, such as the button matrix 33 and the video display 6, but must also be able to receive the various system and sensor status information output by the copier without interfering with the copier's normal operations.

As discussed above with reference to FIG. 1, a typical copier includes a network bus 8 for transmitting data to and from the various system components. Such a configuration effectively creates a local area network (LAN) within the copier system, in which each of the system components is treated as a node defined to the network. In the embodiment of FIG. 2, the IISS, and specifically the control device 20 thereof, is configured as an additional node on this LAN. Such a configuration, while requiring a minor modification to the existing control code of the copier system, ensures that all of the pertinent system data is available to the control device 20. Moreover, the node configuration provides the additional benefit of enabling the integrated information support system to communicate data to the controller 1 of the copier system, if needed. To facilitate this configuration, the control device 20 includes a bus interface 35 which may comprise a communications chip and associated connection hardware (not shown).

Persons skilled in the art will recognize that other configurations are possible for providing status output from the copier system to the integrated information support system. For example, the IISS could be coupled to the copier through an additional serial or parallel communications port. Alternatively, an existing Universal Asynchronous Receiver/Transmitter (UART) connection could be used. Such approaches are less efficient, however, both in terms of financial expense and system overhead. Alternatively, the IISS could be established as a "passive listener" on the network bus 8. While such an approach would obviate the need for modifying the control code of the copier system, this approach is undesirable because of the substantial overhead required for the IISS to reinterpret every message passing across the network bus 8.

As noted above, full integration of the information support system also requires shared use of the user interface facilities of the copier system. That is, both the copier and the integrated information support system must share the same input and output devices. To this end, the interface 34 includes a switching means 36 to enable a single button matrix 33 to be used for controlling the functions of both the copier system and the IISS. The switching means 36 can be, but is not limited to, a microprocessor. During normal operation of the copier, input from the button matrix 33 passes unaltered through the interface 34 to the display controller 7. However, when the button matrix 33 is being used to provide input to the IISS, the switching means 17 operates to pass user input to the button interpreter 32. The button interpreter 32 translates the buttons pressed by the user to appropriate instructions for the information support system, and then passes the instructions to the display controller 7. The button interpreter 32 could alternatively be configured to disable the button matrix 33 when the integrated information support system is displaying information to the user. Likewise, the IISS may control the display yet still permit use of the button matrix 33 to, for example, change a feature selection.

The display controller 7 mentioned above is responsible for coordinating the shared use of the video display 6, ensuring the copier system and the IISS do not simultaneously exert control. As shown in FIG. 2, the display controller 7 is connected to the network bus 8 through a bus interface 37, and thus can receive display data transmitted by the copier system, as well as status data from a plurality of sensors coupled to the network bus 8. Likewise, the display controller 7 is connected to the control device 20 through the interface 34, and thus can receive display data retrieved from the memory device 21. The display controller 7 is configured to recognize the two sources of data, and to suppress the display of data originating from the copier during operation of the IISS.

Many copier systems display images using a character tile format; that is, a group of pixels on the video display 6 (for example, an eight-by-eight pixel square) depicts a single character. Character tile data is typically represented by a binary code, such as an ASCII character code, which limits displayable images to line drawings and text in black, white and two shades of grey. On the other hand, a CD ROM is capable of storing much more sophisticated graphics and videos by virtue of storing such information as bitmap images, where each pixel is defined by a number of bits. Of course, the CD ROM could also store character tile data. Since the photocopier and the integrated information support system share the video display 6, the display controller 7 is ideally configured to process both types of image data.

In the present embodiment, the display controller 7 is an application specific integrated circuit (ASIC). A suitable display controller can be created, for example, by slightly modifying the video engine board of a known display controller, such as the 6845 display controller used in the Model 5100 copier system manufactured by Xerox® Corporation. Though less desirable, an alternative approach would be to provide separate display controllers for handling character tile and bitmap image data. Such a configuration, however, would involve an unnecessary duplication of hardware and would require some type of electronically-controlled video switching means.

The display controller 7 may be coupled to the control device 20 through several lines. For example, a line coupling the display controller 7 to the bitmap controller 30 enables the bitmap controller to send bitmap data directly to the display controller 7 and receive control data directly from the display controller 7. In general, the bitmap controller 30 receives an address from the display controller 7 and retrieves corresponding bitmap image data from memory, such as the RAM 29, or directly from the CD ROM controller 28.

In addition to integrating various hardware components, the user dialog for the information support system must be integrated with the standard user dialog of the copier system. In a preferred embodiment, the user dialog for the IISS generally relates to the standard user dialog in an “either/or” manner. That is, the respective user dialogues are of similar character but, for the most part, are distinct from one another to ensure that the information support system does not interfere with the normal operation of the copier, and to ensure that system users are not annoyed by unsolicited and undesired informational messages. In this embodiment, the IISS provides three different categories of assistance to a system user: spontaneous, on demand, and expert-assisted.

Among the types of information which may be provided to a system user spontaneously by the integrated information support system are “special frames,” such as graphics displayed during idle time, run time and warmup. Other special frames might relate to a choice of languages for informational displays, support for administrative tasks (for example, an indication of machine usage), and the status of supplies in the copier.

A more sophisticated type of spontaneous information display could be triggered when the IISS detects the occurrence of a fault condition as indicated, for example, by sensor output transmitted along the network bus 8. Such fault conditions might include insufficient paper or toner, as well as jam conditions in any of several locations, such as the document handler, the finisher or the paper path. In such a case, the IISS will automatically provide the user with fault correction information.

In a preferred embodiment of the present invention, the presentation of fault correction information is controlled by the expert coach 26 resident in the ROM 25 of the control device 20. The expert coach 26, which typically would be implemented as a software module, is intended to provide necessary information to a user with as little user input as possible. For example, the expert coach 26 can inform the user as to the nature of a fault condition and, either spontaneously or on request, lead the user through the steps that should be taken to correct the fault. The expert coach 26 could also monitor the user’s actions, using output from the various sensors resident in the copier system, to ensure the suggested procedures are being followed. Finally, the expert coach could provide “customer call avoidance” information designed to correct potentially recurring problems, thereby reducing or avoiding the need for service calls. In this way, even a user with very little training or experience can correct many of the faults which commonly occur in copiers.

Aside from fault correction, the majority of information provided by the integrated information support system is provided “on demand”. Such information might include, for example, electronic versions of the information flipcards provided with many copier systems. Another advantageous use of the on-demand feature would be the display of a preprogrammed demonstration which could be used as a sales tool or to support training new users. Unlike existing copier systems, the IISS of the present invention can provide extremely sophisticated training materials combining full motion video, graphical and textual displays, audio information, and monitored hands-on demonstrations of system features, either standing alone or coordinated with the actual machine operation.

As with fault correction information, the presentation of on-demand information can also be controlled by the expert coach 26. For example, a user desiring guidance on general system operations could be led through a hierarchy of options to focus in on particular areas of interest. Alternatively, the expert coach 26 could provide step-by-step instructions for performing a particular operation, effectively leading the user by the hand while monitoring the user’s actions.

The expert coach 26 may also be used to provide information other than in response to system conditions or user requests. For instance, service dialogues could be stored on special compact discs for use by service representatives in performing preventive maintenance operations, providing step-by-step instruction in how to perform various tasks.

As will be recognized from the above description, the present invention offers a cost-effective means for greatly increasing the informational capacity of a copier system without interfering with its normal operations. The result is a much more user-friendly system, with a resulting reduction or elimination of the need for formal training and frequent customer support to explain the operation of the machine.

As discussed above, the embodiment shown in FIG. 2 contemplates an IISS having a controller separate and distinct from the standard control system of the copier system. Persons skilled in the art will readily recognize that the information support system could likewise operate under the direct control of the standard copier system. Such a configuration might be advantageously applied where the information support system is implemented as part of a newly constructed copier. However, where the information support system is enhancing an existing copier, this alternate approach could require an undesirable amount of modifications to the copier's control system to accommodate the added functionality.

While the present invention has been described with reference to specific embodiments, it will be apparent to those skilled in the art that many modifications and variations are possible. Accordingly, the present invention embraces all alternatives, modifications and variations that fall within the spirit and scope of the appended claims, as well as all equivalents thereof.

What is claimed:

1. A supplemental information support system for a copier system having a central controller coupled to a user interface facility including a display device, said supplemental information support system comprising:

a stand-alone memory device storing user reference information;

a display controller coupled to the display device of the copier system; and a control device coupled to the central controller of the copier system, said control device including a microprocessor-based controller, a memory controller coupled to said stand-alone memory device and a control interface coupled to said display controller, wherein said control device is programmed to selectively provide said supplemental information support system with exclusive control over the display device to present user reference information from said stand-alone memory device in response to at least one of a user input, a user action, or an operating condition of the copier system.

2. The supplemental information support system of claim 1, wherein said stand-alone memory device comprises an optical disc memory and said memory controller comprises an optical disc memory controller.

3. The supplemental information support system of claim 2, wherein said control device further comprises an internal memory device coupled to said microprocessor-based controller and said memory controller.

4. The supplemental information support system of claim 3, wherein said display controller comprises an application specific integrated circuit.

5. The supplemental information support system of claim 4, wherein said control device further comprises a bitmap controller coupled to said microprocessor-based controller, said memory controller and said display controller.

6. The supplemental information support system of claim 5, wherein the copier system has a network bus for communicating status information from a plurality of subsystems within the copier system, said control device further including a first bus interface coupled to the network bus.

7. The supplemental information support system of claim 6, wherein said display controller further comprises:

a second bus interface coupled to the network bus; and a display memory.

8. The supplemental information support system of claim 7, wherein said stand-alone memory device further comprises a compact disc read-only memory.

9. The supplemental information support system of claim 2, wherein the copier system has a network bus for communicating status information from a plurality of subsystems within the copier system, said control device further including a first bus interface coupled to the network bus.

10. The supplemental information support system of claim 9, wherein said control device is configured to provide said supplemental information support system with exclusive control over the display device in response to status information received by said first bus interface.

11. The supplemental information support system of claim 10, wherein the user interface facility of the copier system further includes a user input device, said control device being coupled to the user input device.

12. The supplemental information support system of claim 11, wherein said control device further comprises an expert system coupled to said microprocessor-based controller, said memory controller and said first bus interface, said expert system comprising instructions for controlling retrieval of data from said stand-alone memory device for display at the display device in response to input from the user input device.

13. The supplemental information support system of claim 12, wherein the user input device comprises a button matrix.

14. The supplemental information support system of claim 13, wherein said stand-alone memory device comprises a compact disc read-only memory.

15. The supplemental information support system of claim 2, wherein the user interface facility of the copier system further includes a speaker for converting analog data into sound, said control device further comprising a digital-to-analog audio converter coupled to said microprocessor-based controller and said memory controller.

16. The supplemental information support system of claim 2, wherein the user interface facility of the copier system further includes a user input device, said control device being coupled to the user input device.

17. The supplemental information support system of claim 16, wherein the user input device comprises a button matrix.

18. The supplemental information support system of claim 16, wherein said control device is programmed to provide said supplemental information support system with exclusive control over the display device in response to input from the user input device.

19. A supplemental information support system for integration with an existing copier system, the existing copier system including a central controller, a memory, a user input device, a display device, and one or more sensors for monitoring operating conditions of the existing copier system, said supplemental information support system comprising:

a stand-alone memory device storing user reference information;

a memory controller coupled to said stand-alone memory device;

an expert system coupled to said memory controller, said expert system including instructions for initiating retrieval of information from said stand-alone memory device in response to at least one of a user input, a user action, or an operating condition of the existing copier system; and a control interface coupled to the central controller of the existing copier system and to said expert system, said control interface being programmed to selectively provide said supplemental information support system with exclusive control over the user input device and the display device.

20. The supplemental information support system of claim 19, wherein said stand-alone memory device contains digitally-encoded representations of full-motion video information and audio information, said supplemental information support system further comprising:

a display controller coupled to said control interface and to the display device, said display controller being programmed to receive character tile image data originating from the existing copier system and bitmap image data originating from said stand-alone memory device.

* * * * *

UNITED STATES PATENT AND TRADEMARK OFFICE

CERTIFICATE OF CORRECTION

PATENT NO. : 6,601,159 B1
DATED : July 29, 2003
INVENTOR(S) : Smith et al.

It is certified that error appears in the above-identified patent and that said Letters Patent is hereby corrected as shown below:

Title page, Item [54] and Column 1, lines 1-3,
Delete "DYNAMICALLY-SWITCHED SUPPLEMENTAL INFORMATION" and insert -- INTEGRATED INFORMATION SUPPORT SYSTEM FOR A COPIER SYSTEM. --

Signed and Sealed this

Thirtieth Day of December, 2003

JAMES E. ROGAN
*Director of the United States Patent and Trademark Office*